United States Patent [19]

Suminoe et al.

[11] Patent Number: 4,494,954
[45] Date of Patent: Jan. 22, 1985

[54] PROCESS FOR PRODUCING COLORED CONTACT LENS

[75] Inventors: Taro Suminoe, Tokyo; Tetsuo Ito, Machida; Yasuhiro Kiyomatsu, Yokohama; Takao Shimizu, Toda, all of Japan

[73] Assignees: Japan Synthetic Rubber Co., Ltd.; Ricky Contact Lens Research Institute Inc., both of Tokyo, Japan

[21] Appl. No.: 450,040

[22] Filed: Dec. 15, 1982

[30] Foreign Application Priority Data

Dec. 16, 1981 [JP] Japan ................. 56-201450

[51] Int. Cl.$^3$ ............... B29D 11/00; D06P 1/90; D06P 3/00
[52] U.S. Cl. .............................. 8/507; 8/509; 8/650
[58] Field of Search ..................... 8/507, 509

[56] References Cited

U.S. PATENT DOCUMENTS

| | | | |
|---|---|---|---|
| 3,476,499 | 11/1969 | Wichterle | 8/507 |
| 3,850,892 | 11/1974 | Shen et al. | 526/317 |
| 4,157,892 | 6/1979 | Tanaka | 8/507 |
| 4,245,991 | 1/1981 | Haddad et al. | 8/506 |
| 4,310,330 | 1/1982 | Funaki et al. | 8/509 |
| 4,377,389 | 3/1983 | Haddad et al. | 8/506 |

FOREIGN PATENT DOCUMENTS

| | | |
|---|---|---|
| 710230 | 5/1965 | Canada . |
| 802613 | 2/1951 | Fed. Rep. of Germany . |
| 1547525 | 6/1979 | United Kingdom . |
| 1583492 | 1/1981 | United Kingdom . |

OTHER PUBLICATIONS

The Condensed Chemical Dictionary, Tenth Edition, p. 398.
Encyclopedia of Chemical Technology, Third Edition, vol. 8, p. 311.

*Primary Examiner*—A. Lionel Clingman
*Attorney, Agent, or Firm*—Oblon, Fisher, Spivak, McClelland & Maier

[57] ABSTRACT

A uniformly colored shaped article which is resistant to discoloration and fading can be produced by immersing a shaped article, particularly a contact lens, consisting of a polymer of at least one monomer selected from the group consisting of acrylates and methacrylates in a dyeing solution prepared by dissolving a water-soluble dye in a solvent capable of swelling said polymer, to swell and color the shaped article, and then drying the swollen shaped article.

24 Claims, No Drawings

PROCESS FOR PRODUCING COLORED CONTACT LENS

BACKGROUND OF THE INVENTION

1. Field of the Invention

This invention relates to a process for producing colored shaped articles, particularly a process for producing excellent, colored contact lenses.

2. Description of the Prior Art

Contact lenses are used for correcting poor eyesight, and in usual, colorless and transparent ones are on the market. However, colored contact lenses have been desired for the correction of color blindness, for facial beauty, for prevention of dazzlement in strong sunlight, protection of eyes against ultraviolet light, etc.

In order to satisfy such requirements, there have heretofore been proposed a process for producing a colored contact lens by dissolving or dispersing a dye or a pigment in a monomer and then polymerizing the monomer, and a process for producing a colored contact lens by printing or coating a colored layer onto the surface of a contact lens.

However, contact lenses obtained by these coloring methods tend to undergo discoloration or fading owing to oozing-out of the dye while being used. Particularly, water-absorbent soft contact lenses are disadvantageous in that the dye oozes out owing to the required sterilization of the lenses by boiling or with a cold sterilizing solution, so that the lenses are liable to undergo discoloration.

Therefore, a need still exists for a process for producing a uniformly colored shaped article which undergoes minor discoloration or fading due to oozing-out of the coloring dye.

SUMMARY OF THE INVENTION

The object of this invention is to provide a process for producing a uniformly colored shaped article which undergoes neither discoloration nor fading due to oozing-out of the dye while being used.

According to this invention, there is provided a process for producing a colored shaped article, characterized by immersing a shaped article consisting of a polymer of at least one monomer selected from the group consisting of acrylates and methacrylates in a dyeing solution prepared by dissolving a water-soluble dye in a solvent capable of swelling said polymer, to swell and color the shaped article and drying the swollen shaped article.

The method for coloring a shaped article of this invention is characterized in that the discoloration or fading due to oozing-out of the dye from the shaped article is prevented by uniformly penetrating and dispersing a water-soluble dye into a swollen lipophilic polymer. In particular, colored contact lenses obtained according to this invention are substantially non-hydrous, and even if they are repeatedly subjected to such after-treatment as sterilization by boiling or with a cold sterilizing solution, the dye is not extracted though they do not require said sterilization unlike water-absorbent soft contact lenses. Therefore, the lenses are not discolored.

As the acrylate and/or the methacrylate which are the monomers for the polymer used as a base material for the shaped article in this invention, there may be mentioned, for example, acrylates such as methyl acrylate, ethyl acrylate, n-propyl acrylate, i-propyl acrylate, n-butyl acrylate, i-butyl acrylate, t-butyl acrylate, 2-ethylhexyl acrylate, n-octyl acrylate, and like, and methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, n-hexyl methacrylate, n-octyl methacrylate and the like. These compounds may be used alone or in combination of two or more.

The polymer used as a base material for the shaped article in this invention is preferably a crosslinked polymer prepared by copolymerizing a polyfunctional monomer with the above-mentioned monomer or monomers in order to improve the mechanical strength of the shaped article and to keep its desired dimension and form. As the polyfunctional monomer used for the crosslinking, there may be used polyfunctional acrylates or methacrylates, for example, glycol diacrylates of olefins or polyolefins such as ethylene glycol diacrylate, diethylene glycol diacrylate, triethylene glycol diacrylate and the like; glycol dimethacrylates of olefins or polyolefins such as ethylene glycol dimethacrylate, diethylene glycol dimethacylate, triethylene glycol dimethacrylate and the like; trimethylolpropane trimethacrylate; allyl acrylate; vinyl-substituted benzylacrylates; and the like. These polyfunctional monomers may be used alone or in combination of two or more. The amount of these polyfunctional monomers copolymerized is preferably 0.1 to 50 mole %, particularly preferably 0.5 to 10 mole % based on the total amount of the acrylates, methacrylates and polyfunctional monomers. When it is less than 0.1 mole %, the resulting shaped article is not sufficiently improved in mechanical strength and is not sufficiently dimension-stabilized. On the other hand, when it exceeds 50 mole %, the swelling of a shaped article becomes insufficient at the time of immersing the shaped article in a dyeing solution, so that the shaped article becomes difficult to color uniformly to the inside.

As methods for shaping a polymer as a base material into a shaped article having the desired form in this invention, there may be exemplified, for example, a method by which the above-mentioned monomer is polymerized in a mold so as to obtain a polymer block and said polymer block is shaped to a desired form such as a contact lens form by cutting; and a method by which the shaping is conducted by polymerizing the above-mentioned monomer in a mold having a desired form such as a contact lens form.

The polymerization of the above-mentioned monomer can be effected by heating or by irradiation with light such as ultraviolet light or electron rays by using a polymerization initiator, for example, a peroxide such as benzoyl peroxide, lauroyl peroxide or the like; an azo compoud such as azobisisobutyronitrile or the like; or a carbonium compound such as diacetyl, benzoin, benzoin ether or the like. Although the polymerization temperature is not critical so long as it is in such a range that a monomer to be polymerized retains a liquid state, it is preferably about 10° to 50° C. in order to reduce the inner stress of a shaped article produced by using the resulting polymer.

In this invention, when a polymer to be used as a base material for shaped article is a soft polymer having a low glass transition temperature and hence is difficult to subject to cutting or the like, there may, of course, be employed a method which comprises preparing a crosslinked hard polymer having a high glass transition temperature by copolymerizing a polyfunctional monomer as an essential component with a monomer properly selected from the above-mentioned monomers and, if necessary, acrylic acid, methacrylic acid or the like, cutting the polymer into the form of the desired shaped article, and then making it into a soft shaped article having a low glass transition temperature by subjecting the ester or carboxyl group of the polymer to ester interchange or esterification with an alcohol. This method is the technology disclosed in U.S. Pat. No. 3,850,892, and a soft shaped article of precise dimension and form can easily be obtained by employing said method.

There is described below a method for coloring the shaped article having the desired form obtained in the manner described above. First, there is prepared a dyeing solution of a water-soluble dye in a solvent capable of swelling the polymer to be used as the base material for the shaped article and said shaped article is then immersed in said dyeing solution to be swollen, whereby a shaped article uniformly colored to the inside can be obtained. In this case, it is, of course, also possible to color only the surface layer of the shaped article without penetrating the dye to the inside.

The water-soluble dye used in this invention is soluble in water and in solvents capable of swelling a polymer to be used as a base material for the shaped article, and includes, for example, those mentioned in the new eddition of "Manual of Dyes" edited by Organic Synthetic Chemistry Society of Japan, 1970, published by Maruzene.

There may be used as the water-soluble dye, for example, acidic dyes, such as C.I. Acid Red 27 (C.I. No. 16185), C.I. Acid Red 51 (C.I. No. 45430), C.I. Acid Red 18 (C.I. No. 16255), C.I. Acid Red 87 (C.I. No. 45380), C.I. Acid Red 92 (C.I. No. 45410), C.I. Acid Red 94 (C.I. No. 45440), C.I. Acid Red 94 (C.I. No. 45440), C.I. Acid Red 52 (C.I. No. 45100), C.I. Acid Yellow 3 (C.I. No. 47005), C.I. Acid Yellow 23 (C.I. No. 19140), C.I. Acid Green 5 (C.I. No. 42095), C.I. Acid Blue 9 (C.I. No. 42090), C.I. Acid Blue 74 (C.I. No. 73015), C.I. Acid Violet 49 (C.I. No. 42640), C.I. Acid Orange 11 (C.I. No. 45370), C.I. Acid Orange 11 (C.I. No. 45370), C.I. Acid Yellow 73 (C.I. No. 45350), C.I. Acid Green 25 (C.I. No. 61570), C.I. Acid Blue 5 (C.I. No. 42052), C.I. Acid Orange 24 (C.I. No. 20170), C.I. Acid Yellow 11 (C.I. No. 18820), C.I. Acid Yellow 76 (C.I. No. 18850), C.I. Acid Orange 1 (C.I. No. 13091), C.I. Acid Orange 7 (C.I. No. 15510), C.I. Acid Red 6 (C.I. No. 14680), C.I. Acid Red 51 (C.I. No. 45430), C.I. Acid Violet 43 (C.I. No. 60730), C.I. Acid Blue 29 (C.I. No. 20460), C.I. Acid Blue 102 (C.I. No. 50320), C.I. Acid Green 3 (C.I. No. 42085), C.I. Acid Green 7, C.I. Acid Brown 13 (C.I. No. 10410), C.I. Acid Brown 46, C.I. Acid Black 2 (C.I. No. 50420), C.I. Acid Black 7 (C.I. No. 26300) and the like; basic dyes, such as C.I. Basic Violet 10 (C.I. No. 45170), C.I. Basic Yellow 1 (C.I. No. 49005), C.I. Basic Yellow 2 (C.I. No. 41000), C.I. Basic Orange 14 (C.I. No. 46005), C.I. Basic Orange 15 (C.I. No. 46045), C.I. Basic Red 1 (C.I. No. 45160), C.I. Bacic Red 9 (C.I. No. 42500), C.I. Basic Violet 1 (C.I. No. 42535), C.I. Basic Violet 3 (C.I. No. 42555), C.I. Basic Blue 1 (C.I. No. 42025), C.I. Basic Blue 3 (C.I. No. 51005), C.I. Basic Blue 5 (C.I. No. 42140), C.I. Basic Green 1 (C.I. No. 42040), C.I. Basic Green 4 (C.I. No. 42000), C.I. Basic Brown 1 (C.I. No. 21000) and the like; direct dyes such as C.I. Direct Orange 26 (C.I. No. 29150), C.I. Direct Orange 29 (C.I. No. 29155), C.I. Direct Yellow 26 (C.I. No. 25300), C.I. Direct Red 23 (C.I. No. 29160), C.I. Direct Red 4 (C.I. No. 29165), C.I. Direct Yellow 8 (C.I. No. 13920), C.I. Direct Violet 98, C.I. Direct Green 33 (C.I. No. 34270), C.I. Direct Brown 44 (C.I. No. 35010), C.I. Direct Black 17 (C.I. No. 27700), C.I. Direct Black 19 (C.I. No. 35255), C.I. Direct Blue 237, C.I. Direct Green 63 and the like; vat dyes such as C.I. Vat Blue 1 (C.I. No. 73000), C.I. Vat Blue 6 (C.I. No. 69825), C.I. Vat Blue 18 (C.I. No. 59815), C.I. Solubilised Vat Blue 1 (C.I. No. 73002), C.I. Solubilised Vat Brown 1 (C.I. No. 70801) and the like. Moreover, there may also be used dyes such as C.I. Food Yellow (C.I. No. 15985), C.I. Food Green (C.I. No. 42053), and the like. Among these dyes, the acidic, basic and direct dyes are preferred in view of ease of dyeing.

As the solvent capable of dissolving the dye used in this invention and of swelling a polymer which is a base material for the shaped article, there may be used, for example, lower alcohols such as methyl alcohol, ethyl alcohol, is-opropyl alcohol and the like; ketones such as acetone, methyl ethyl ketone and the like; chlorinated hydrocarbons such as dichloromethane, chloroform and the like; ethers such as diethyl ether, ethylene glycol monomethyl ether, ethylene glycol monobutyl ether diethylene glycol monomethyl ether, and the like; and esters such as ethyl acetate, methyl formate, ethyl formate, butyl formate, and the like. These solvents may be used alone or in combination of two or more.

Further, when the dye cannot be dissolved by using the above-mentioned solvents alone, it is also possible to prepare a dyeing solution by adding a small amount of water, for example, adding water in an amount of 1 to 20 parts by weight per 100 parts by weight of the solvent, or by adding, in the case of a vat dye, a small amount of an aqueous alkaline reducing solution, for example, adding, per 100 parts by weight of the solvent, 0.5 to 10 parts by weight of an aqueous solution prepared by adding 5 to 20 parts by weight of sodium hydroxide and 3 to 20 parts by weight of sodium hyposulfite to 100 parts by weight of water.

In the process of this invention, a shaped article having the desired form is immersed in a dyeing solution prepared by dissolving a water-soluble dye in the above-mentioned solvent to swell the former, whereby the dye is penetrated into the inside of the shaped article, after which the shaped article is taken out and then dried. Subsequently, the resulting colored shaped article was washed with water to remove the dye remaining attached on the surface of the article.

The dye concentration in the dyeing solution is usually 0.001 to 10% by weight, though may properly be varied depending upon the kind of the dye.

The shaped article is usually immersed in the dyeing solution at a temperature of 0° to 70° C., preferably 15° to 50° C.

The time for the shaped article to be immersed in the dyeing solution is usually about 10 seconds to 2 hours, and it is possible to color only the thin surface layer of the shaped article by shortening the immersion time. In particular, in the case of a hard polymer shaped article, the complete swelling of the shaped article in the dyeing solution results, in some cases, in deformation of the shaped article because the shaped article cannot be returned to its original form owing to its inner stress even after the solvent has been removed and the article has been dried. In such a case, it is preferable to color only the thin surface layer of the shaped article by shortening the immersion time.

Even in the case of coloration of only the thin surface layer of such a shaped article, there can be obtained a uniformly colored shaped article free from unevenness in color without the dye oozing out.

According to this invention, there can be obtained a shaped article which is free from unevenness in color and is uniformly colored and from which the dye does not ooze out. Therefore, when colored contact lenses are produced according to this invention, contact lenses good to eyes can be obtained, and the shaped articles undergo neither discoloration nor fading even if they are used for a long time. This is considered to be because the colored shaped article are not those obtained by coloring, with an oil-soluble dye, a lipophilic polymer such as a polymer of an acrylate and/or a methacrylate which is a base material for shaped article, but those obtained by uniformly dispersing a water-soluble dye into a lipophilic polymer, and therefore the dye does not exist dissolved in the polymer, and accordingly does not migrate in the polymer to ooze out of the polymer. Further, unlike water-absorbent soft contact lenses, the polymer which is a base material for the shaped article of this invention is substantially non-hydrous, and therefore, there is seen no phenomenon of the dye oozing out owing to water-absortion and swelling as seen in the water-absorbent contact lenses.

This invention is further explained below in more detail referring to Examples, which are merely by way of illustration and not by way of limitation.

EXAMPLE 1

Into a polyethylene mold having a diameter of 15 mm and a height of 20 mm was poured a mixture of 250 g of acrylic acid, 250 g of n-butyl methacrylate, 20 g of ethylene glycol dimethacrylate and 6 mg of benzoin, and irradiated with ultraviolet light in a nitrogen gas atmosphere at room temperature to be subjected to polymerization. The resulting polymer block was shaped into a contact lens form by usual cutting. Subsequently, the thus obtained lens was immersed in n-propyl alcohol, and 1% by weight of methanesulfonic acid was then added thereto, after which the resulting mixture was heated at a refluxing temperature for 24 hours to esterify completely the carboxyl groups in the polymer. After the reaction, the lens was washed with n-propyl alcohol and dried to obtain a soft contact lens. The soft contact lens was immersed at room temperature for 1 hour in a dyeing solution prepared by adding 100 g of methyl alcohol to 1 g of C.I. Acid Blue 9 (C.I. No. 42090). After the immersion, the swollen and colored soft contact lens was dried at 95° C. for 16 hours, and then sufficiently washed with water to remove the dye attaching to the surface of the contact lens, whereby a colored contact lens was obtained.

Even when the colored soft contact lens was subjected to boiling treatment for 7 days at atmospheric pressure neither discoloration nor fading was caused.

When the colored soft contact lens was applied to eye and used for three months at a proportion of 8 hours per day, substantial no discoloration or fading was caused, and the dye-retention determined from absorbance at 630 nm was 97%. The term "dye-retention" used herein means a proportion of the absorbance after the application to the absorbance before the application.

EXAMPLE 2

A contact lens obtained by polymerization and softened in the same manner as in Example 1 was immersed at room temperature for 1 hour in a dyeing solution prepared by adding 10 g of diethyl ether and 90 g of ethyl alcohol to 0.5 g of C.I. Acid Yellow 3 (C.I. No. 47005). After the immersion, the swollen and colored soft contact lens was dried at 95° C. for 16 hours and then sufficiently washed with water to remove the dye attaching to the surface of the contact lens, whereby a colored contact lens was obtained.

Even when the colored soft contact lens was subjected to boiling treatment for 7 days at atmospheric pressure, neither discoloration nor fading was caused.

When the colored soft contact lens was applied to eye and used for three months at a proportion of 8 hours per day, substantially no discoloration or fading was caused, and the dye-retention determined from absorbance at 390 nm was 94%.

EXAMPLE 3

A contact lens obtained by polymerization and softened in the same manner as in Example 1 was immersed at room temperature for 30 minutes in a dyeing solution prepared by adding 10 g of water and 90 g of acetone to 1 g of C.I. Acid Blue 5 (C.I. No. 42052). After the immersion, the swollen and colored soft contact lens was dried at 95° C. for 16 hours and then sufficiently washed with water to remove the dye attaching to the surface of the contact lens, whereby a colored contact lens was obtained.

Even when the colored soft contact lens was subjected to boiling treatment for 7 days at atmospheric pressure, neither discoloration nor fading was caused.

When the colored soft contact lens was applied to eye and used for three months at a proportion of 8 hours per day, substantially no discoloration or fading was caused, and the dye-retention determined from absorbance at 630 nm was 95%.

EXAMPLE 4

A mixture of 250 g of t-butyl acrylate, 250 g of n-butyl methacrylate, 25 g of ethylene glycol dimethacrylate and 8 mg of benzoin was subjected to polymerization in the same manner as in Example 1, and the resulting polymer was shaped into a contact lens form by cutting. Subsequently, the thus obtained lens was immersed at room temperature for 30 seconds in a dyeing solution prepared by adding 15 g of water and 85 g of ethyl alcohol to 3 g of C.I. Acid Blue 9 (C.I. No. 42090). After the immersion, the thus obtained hard contact lens having a swollen and colored thin surface layer was dried at 40° C. for 48 hours and then sufficiently washed with water to remove the dye attaching to the surface of the contact lens, whereby a colored contact lens was obtained.

Even when the colored hard contact lens was immersed in flowing water for 1 month, neither discoloration nor fading was caused.

When the colored soft contact lens was applied to eye and used for three months at a proportion of 8 hours per day, substantially no discoloration or fading was caused, and the dye-retention determined from absorbance at 630 nm was 96%.

EXAMPLE 5

Into a lens mold having a diameter of 13 mm were poured 200 g of t-butyl acrylate, 300 g of n-butyl acrylate, 20 g of tetraethylene glycol diacrylate and 6 mg of benzoin, and they were polymerized by irradiating them with ultraviolet rays at room temperature, after which the shaped article was taken out of the mold and ground to form a soft contact lens.

The soft contact lens thus formed was immersed at room temperature for one hour in a dyeing solution prepared by dissolving 1 g of C.I. Acid Blue 9 (C.I. No. 42090) in 100 g of methyl alcohol, after which the swollen and colored contact lens was dried at 95° C. for 16 hours, and thereafter well washed with water to remove the dye attaching to the surface of the contact lens, thereby obtaining a colored contact lens.

Even when the colored soft contact lens was subjected to boiling treatment for 7 days at atmospheric pressure, neither discoloration nor fading was caused.

When the colored soft contact lens was further applied to eye and used for three months at a proportion of 8 hours per day, substantially no discoloration or fading was caused, and the dye-retention determined from absorbance at 630 nm was 93%.

EXAMPLE 6

The same procedure as in Example 3 was repeated, except that C.I. Basic Blue 1 (C.I. No. 42025) was substitued for the C.I. Acid Blue 5, to obtain a colored soft contact lens.

Even when the colored soft contact lens was subjected to boiling treatment for 7 days at atmospheric pressure, neither discoloration nor fading was caused.

When the colored soft contact lens was applied to eye and used for three months at a proportion of 8 hours per day, substantially no discoloration or fading was caused, and the dye-retention determined from absorbance at 630 nm was 90%.

EXAMPLE 7

A contact lens obtaind by polymerization and softened in the same manner as in Example 1 was immersed at room temperature for 30 minutes in a dyeing solution prepared by adding 100 g of ethyl alcohol to 1 g of C.I. Direct Brown 44 (C.I. No. 35010). After the immersion, the swollen and colored soft contact lens was dried at 95° C. for 16 hours and then sufficiently washed with water to remove the dye attaching to the surface of the contact lens, whereby a colored contact lens was obtained.

Even when the colored soft contact lens was subjected to boiling treatment for 7 days at atmospheric pressure, neither discoloration nor fading was caused.

When the colored soft contact lens was applied to eye and used for three months at a proportion of 8 hours per day, substantially no discoloration or fading was caused, and the dye-retention determined from absorbance at 585 nm was 89%.

EXAMPLE 8

A contact lens obtained by polymerization and softened in the same manner as in Example 1 was immersed at room temperature for 30 minutes in a dyeing solution prepared by adding to 100 g of acetone 2 g of C.I. Vat Blue.18 and 5 g of an aqueous solution consisting of 100 g of water, 5 g of sodium hydroxide and 10 g of sodium hyposulfite. After the immersion, the swollen and colored soft contact lens was dried at 90° C. for 16 hours and then sufficiently washed with water to remove the dye attaching to the surface of the contact lens, whereby a colored contact lens was obtained.

Even when the colored soft contact lens was subjected to boiling treatment for 7 days at atmospheric pressure, neither discoloration nor fading was caused.

When the colored soft contact lens was applied to eye and used for three months at a proportion of 8 hours per day, substantially no discoloration or fading was caused, and the dye-retention determined from absorbance at 480 nm was 91%.

COMPARATIVE EXAMPLE

A soft contact lens prepared by polymerization in the same manner as in Example 1 was immersed at room temperature for one hour in a dyeing solution prepared by adding 100 g of methyl alcohol to C.I. Solvent Blue 12 (C.I. No. 62100) which is an oil-soluble dye, after which the swollen and colored soft contact lens was dried at 95° C. for 16 hours. Thereafter, a neutral detergent was applied to the dried contact lens and the contact lens was well washed with water to remove the dye attaching to the surface of the contact lens, thereby obtaining a colored contact lens.

When the colored soft contact lens was applied to eye and used for three months at a proportion of 8 hours per day, the lens was substantially decolorized and the dye-retention determined from absorbance at 630 nm was 17%.

What is claimed is:

1. A process for producing a color shaped article, comprising:
   (a) immersing a shaped article consisting of a substantially non-hydrous polymer of at least one monomer selected from the group consisting of acrylates and methacrylates in a dyeing solution prepared by dissolving a water-soluble dye in a solvent capable or swelling said polymer; said solvent being used alone or in combination with up to 20 parts by weight of water or up to 10 parts by weight of an aqueous alkaline reducing solution per 100 parts by weight of the solvent,
   (b) swelling and coloring the shaped article, and then
   (c) drying the swollen shaped article.

2. A process according to claim 1, wherein the shaped article is a contact lens.

3. A process according to claim 1, wherein the monomer is selected from the group consisting of methyl acrylate, ethyl acrylate, n-propyl acrylate, i-propyl acrylate, n-butyl acrylate, i-butyl acrylate, t-butyl acrylate, 2-ethylhexyl acrylate, n-octyl acrylate, methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, n-hexyl methacrylate and n-octyl methacrylate.

4. A process according to claim 1, wherein the polymer is a copolymer with a polyfunctional monomer.

5. A process according to claim 3, wherein the polymer is a copolymer with a polyfunctional monomer.

6. A process according to claim 4, wherein the polyfunctional monomer is a compound selected from the group consisting of ethylene glycol diacrylate, diethylene glycol diacrylate, triethylene glycol diacrylate, ethylene glycol dimethacrylate, diethylene glycol dimethacrylate, triethylene glycol dimethacrylate, trimethylolpropane trimethacrylate, allyl acrylate and vinyl-substituted benzylacrylate.

7. A process according to claim 4, wherein the amount of the polyfunctional monomer copolymerized is 0.1 to 50 mole % based on the total amount of the acrylates, methacrylates and the polyfunctional monomers.

8. A process according to claim 1, wherein the solvent is at least one compound selected from the group consisting of lower alcohols, ketones, chlorinated hydrocarbons, ethers and esters.

9. A process according to claim 1, wherein the solvent is at least one member selected from the group consisting of methyl alcohol, ethyl alcohol, isopropyl alcohol, acetone, methyl ethyl ketone, dichloromethane, chloroform, diethyl ether, ethylene glycol monomethyl ether, ethylene glycol monobutyl ether, diethylene glycol monomethyl ether, ethyl acetate, methyl formate, ethyl formate and butyl formate.

10. A process according to claim 1, wherein the dye concentration in the dyeing solution is 0.001 to 10% by weight.

11. A process according to claim 9, wherein the immersion time is 10 seconds to 2 hours.

12. A process according to claim 1, wherein the dye is selected from the group consisting of direct dyes, acidic dyes, basic dyes and water-soluble vat dyes.

13. A process according to claim 2, wherein the dye is selected from the group consisting of direct dyes, acidic dyes and basic dyes.

14. A colored shaped article obtained by the process according to claim 1.

15. A colored contact lens obtained by the process according to claim 2.

16. A colored contact lens obtained by the process according to claim 3.

17. A colored contact lens obtained by the process according to claim 4.

18. A colored contact lens obtained by the process according to claim 7.

19. A colored contact lens obtained by the process according to claim 8.

20. A colored contact lens obtained by the process according to claim 13.

21. The process of claim 1, wherein the solvent contains 1 to 20 parts by weight of water per 100 parts by weight of the solvent.

22. The process of claim 1, wherein the solvent contains 0.5 to 10 parts by weight of the aqueous alkaline reducing solution per 100 parts by weight of the solvent.

23. The process of claim 1, wherein the aqueous alkaline reducing solution is prepared by adding 5 to 20 parts by weight of sodium hydroxide and 3 to 20 parts by weight of sodium hyposulfite to 100 parts by weight of water.

24. The process of claim 22, wherein the aqueous alkaline reducing solution is prepared by adding 5 to 20 parts by weight of sodium hydroxide and 3 to 20 parts by weight of sodium hyposulfite to 100 parts by weight of water.

* * * * *